US011170398B1

(12) United States Patent
Goldstein (10) Patent No.: US 11,170,398 B1
(45) Date of Patent: Nov. 9, 2021

(54) METHODS AND SYSTEMS FOR PERSON-TO-PERSON REWARD CURRENCY REDEMPTION

(71) Applicant: CITICORP CREDIT SERVICES, INC. (USA), Sioux Falls, SD (US)

(72) Inventor: Linda Goldstein, Tenafly, NJ (US)

(73) Assignee: CITICORP CREDIT SERVICES, INC. (USA), Sioux Falls, SD (US)

( * ) Notice: Subject to any disclaimer, the term of this patent is extended or adjusted under 35 U.S.C. 154(b) by 1314 days.

(21) Appl. No.: 13/631,147

(22) Filed: Sep. 28, 2012

(51) Int. Cl.
*G06Q 30/02* (2012.01)

(52) U.S. Cl.
CPC .............................. *G06Q 30/0228* (2013.01)

(58) Field of Classification Search
CPC ..... G06Q 30/00; G06Q 30/0207–0277; G06Q 30/0228
See application file for complete search history.

(56) References Cited

U.S. PATENT DOCUMENTS

| | | | | |
|---|---|---|---|---|
| 6,116,505 | A * | 9/2000 | Withrow ............... | G06Q 20/342 235/375 |
| 7,613,629 | B2 | 11/2009 | Antonucci et al. | |
| 7,828,206 | B2 | 11/2010 | Hessburg et al. | |
| 7,934,986 | B2 * | 5/2011 | Kane ................... | G06Q 30/0207 463/18 |
| 8,050,968 | B2 | 11/2011 | Antonucci et al. | |
| 8,108,304 | B2 | 1/2012 | Loeger et al. | |
| 8,131,590 | B1 * | 3/2012 | Armstrong ........ | G06Q 30/0208 705/14.11 |
| 8,180,671 | B2 | 5/2012 | Cohagan et al. | |
| 2003/0225619 | A1 | 12/2003 | Dokken et al. | |
| 2007/0011089 | A1 * | 1/2007 | DeSchryver ......... | G07F 19/201 705/39 |
| 2009/0024483 | A1 * | 1/2009 | Urban .................... | G06Q 30/02 705/14.27 |
| 2009/0299846 | A1 | 12/2009 | Brueggemann et al. | |
| 2010/0114733 | A1 * | 5/2010 | Collas ................... | G06Q 20/12 705/26.1 |
| 2010/0250355 | A1 * | 9/2010 | McInnes ............ | G06Q 30/0215 705/14.18 |

(Continued)

FOREIGN PATENT DOCUMENTS

WO    WO 2001/001278 A2    1/2001

OTHER PUBLICATIONS

Points.Com et al., "Points.Com Introduces Loyalty Points Transfer and Gift Registry to JetBlue's TrueBlue Members," Points.Com Global Newswire, Toronto, Canada, Dec. 19, 2011, pp. 1-2.

(Continued)

*Primary Examiner* — David J Stoltenberg
*Assistant Examiner* — Michael J Cross
(74) *Attorney, Agent, or Firm* — Johnson, Marcou, Isaacs & Nix, LLC; George Marcou; Scott A. Hendrix (57) ABSTRACT

Methods and systems for person-to-person reward currency redemption involve, for example, receiving a request to redeem of reward currency of a reward currency holder as a direct deposit of cash to a deposit account of a recipient using a processor coupled to memory; converting the reward currency to an amount of cash based on a predefined conversion rate likewise using the processor; and also using the processor, transferring the amount of cash to the deposit account of the recipient.

20 Claims, 3 Drawing Sheets

(56) References Cited

U.S. PATENT DOCUMENTS

| | | |
|---|---|---|
| 2011/0004558 A1 | 1/2011 | MacLean et al. |
| 2011/0055077 A1* | 3/2011 | French ............... G06Q 20/04 |
| | | 705/39 |
| 2011/0238553 A1 | 9/2011 | Raj et al. |
| 2012/0041810 A1 | 2/2012 | Hofer |
| 2012/0047008 A1* | 2/2012 | Alhadeff ............ G06Q 30/0214 |
| | | 705/14.16 |
| 2012/0095820 A1 | 4/2012 | Chandrasekaram et al. |
| 2012/0150743 A1 | 6/2012 | Isaacson et al. |
| 2012/0197692 A1 | 8/2012 | Ganz et al. |
| 2012/0197707 A1 | 8/2012 | Cohagan et al. |
| 2012/0232980 A1* | 9/2012 | Wald ............... G06Q 30/0233 |
| | | 705/14.27 |

OTHER PUBLICATIONS

Oracle et al., "Siebel Loyalty Management 8.1.1," Oracle, Oracle Data Sheet, Oracle® 2008, pp. 1-4.

IP.Com et al., "Method and Processing of Sharing and Transacting Online Points Using Social Collaborative Tools," IP.Com Prior Art Database, IPCOM000216310D, Mar. 29, 2012, pp. 1-6.

* cited by examiner

METHODS AND SYSTEMS FOR PERSON-TO-PERSON REWARD CURRENCY REDEMPTION

FIELD OF THE INVENTION

The present invention relates generally to the field of electronic commerce, and more particularly to methods and systems for person-to-person reward currency redemption.

BACKGROUND OF THE INVENTION

Currently, credit card reward programs typically provide limited options on redemption that require a card member to access a particular rewards suite. Such programs require the card member either to make a request to receive the card member's rewards as cash or to make a request to convert the card member's rewards into a gift card, merchandise or the like. While financial institutions have investigated various ways to expand redemption options to make rewards more immediate and tangible for card members, there is presently no method available that enables a card member to convert his or her rewards currency into cash and give the cash to another person other than by doing it, for example, with a gift card. In the gift card process, the card member may place an order for a gift card and have it sent directly to the donee or wait to receive the gift card, and then deliver the gift card to a donee. In the cash process, the card member may, for example, request cash back in the form of a check, deposit or have the check deposited in his or her account, and either write a check or dispense cash to the donee. There is currently no mechanism in the industry that enables a card member to give his or her rewards as cash to someone else or to himself or herself in a seamless electronic process.

There is a present need for methods and systems for person-to-person reward currency redemption that provide redemption options that enable transaction card holders to redeem their rewards currency for cash and to dispense that cash via person-to-person payment technology.

SUMMARY OF THE INVENTION

Embodiments of the invention employ computer hardware and software, including, without limitation, one or more processors coupled to memory and non-transitory computer-readable storage media with one or more executable programs stored thereon which instruct the processors to perform the person-to-person reward currency redemption described herein. Embodiments of the invention provide methods and systems for person-to-person reward currency redemption that may involve, for example, receiving, using a redemption platform processor, a request to redeem a pre-determined amount of reward currency of a reward currency holder as a direct deposit of cash to a deposit account of a recipient; converting, likewise using the redemption platform processor, the pre-determined amount of reward currency to an amount of cash based on a predefined conversion rate; and transferring, also using the redemption platform processor, the amount of cash to the deposit account of the recipient.

It is to be understood that the term "reward currency" is intended to cover any and all types of rewards or awards, including without limitation, points, miles, or cash-back rewards or awards, associated with any and all types of accounts, including without limitation, accounts related to transaction cards, such as credit cards, pre-paid cards, gift cards, debit cards, loyalty cards, rewards cards, points cards, frequent flyer cards, frequent shopper cards, bank cards, check cards, charge cards, co-branded cards, and private label cards. It is to be further understood that the term "person" as used in "person-to-person" is not limited to a single person but is intended to cover any number of persons, and that the terms "person" or "persons" is not limited to human beings but includes any entity or entities capable of owning a deposit account, including without limitation, human beings, firms, organizations, partnerships, associations, and corporations. It is likewise to be understood that the term "reward currency holder" may include a single reward currency holder or any number of reward currency holders and that the term "recipient" may include a single recipient or any number of recipients.

In an aspect of embodiments of the invention, receiving the request to redeem may involve, for example, receiving the request via a user interface using a processor of an electronic communication device. In another aspect, receiving the request to redeem using the processor of the electronic communication device may involve, for example, receiving the request to redeem using the processor of an online electronic computing device. In a further aspect, receiving the request via the user interface may involve, for example, receiving the request via an electronic user interface integrated into an online application. In an additional aspect, receiving the request via the user interface using the processor of the electronic communication device may involve, for example, receiving the request via a mobile communication device application or a tablet computing device application. In still another aspect, receiving the request to redeem may involve, for example, receiving the request via a user interface using an automated teller machine. In a still further aspect, receiving the request to redeem may involve, for example, receiving the request via a user interface using an interactive voice response ("IVR") phone channel.

In an additional aspect of embodiments of the invention, receiving the request to redeem may involve, for example, generating a notification message to the reward currency holder and sending a redemption request message to a reward system processor. In other aspects, generating the notification message to the reward currency holder may involve, for example, generating the notification message to the reward currency holder via email, SMS text, or telephone. In further aspects, receiving the request to redeem the predetermined amount of reward currency may involve, for example, receiving the request to redeem the predetermined amount of reward currency associated with a transaction card account of the reward currency holder. In another aspect, receiving the request to redeem the reward currency as a direct deposit of cash to the deposit account of the recipient may involve, for example, receiving the request to redeem the reward currency as a direct deposit of cash to a checking account of the recipient.

In a further aspect of embodiments of the invention, converting the pre-determined amount of reward currency may involve, for example, updating a redemption history of a rewards account of the reward currency holder to a "pending" status and earmarking and temporarily blocking redemption of the pre-determined amount of reward currency via other means. In additional aspects, converting the pre-determined amount of reward currency may involve, for example, generating a notification message alerting the recipient of the amount of cash to be transferred to the deposit account of the recipient and a predetermined time period within which the recipient may claim the amount of cash. In another aspect, generating the recipient notification message to the recipient may involve, for example, generating the notification message via email, SMS text, or telephone.

In a still further aspect of embodiments of the invention, generating the notification message to the recipient may involve, for example, generating the notification message to the recipient consisting at least in part of a request to the recipient to verify the recipient's identity and to provide routing and account information for the deposit account of the recipient. In another aspect, generating the notification message to the recipient consisting at least in part of the request to verify the recipient's identity and to provide routing and account information may involve, for example, receiving entry of information verifying the recipient's identity and the routing and deposit account information for the deposit account of the recipient. In other aspects, receiving entry of the information may involve, for example, confirming verification of the recipient's identity, updating a redemption history of the reward currency holder's rewards account from a "pending" status to a "redeemed" status, and releasing an earmarked pre-determined amount of rewards currency for conversion to the amount of cash.

In still another aspect of embodiments of the invention, transferring the amount of cash to the deposit account of the recipient may involve, for example, placing the amount of cash in a financial institution master checking account. In an additional aspect, transferring the amount of cash to the deposit account of the recipient may involve, for example, initiating a transfer of the cash from the financial institution master checking account to the recipient's checking account. In a further aspect, initiating the transfer of the cash from the financial institution master checking account to the recipient's checking account may involve, for example, crediting the amount of cash to the recipient's checking account at another financial institution via an Automated Clearing House ("ACH") network process. In yet another aspect, transfer of the cash from the financial institution master checking account to the recipient's checking account may involve, for example, crediting the amount of cash to the recipient checking account at the same financial institution.

In an additional aspect of embodiments of the invention, initiating the transfer of the cash from the financial institution master checking account to the recipient's checking account may involve, for example, crediting the amount of cash to the recipient checking account and allowing the recipient to access the recipient checking account and see the cash listed as a person-to-person redemption. In a further aspect, initiating the transfer of the cash from the financial institution master checking account to the recipient's checking account may involve, for example, crediting the amount of cash to the recipient checking account and making the amount of cash available to the recipient if the recipient verifies the recipient's identity within a predetermined period of time. In a still further aspect, making the amount of cash available to the recipient if the recipient verifies the recipient's identity within a predetermined period of time may involve, for example, returning the amount of cash to the financial institution master checking account and generating a message alerting the reward currency holder that the redemption was not completed if the recipient fails to verify the recipient's identity within the predetermined period of time. In another aspect, the recipient and the reward currency holder may be the same person.

These and other aspects of the invention will be set forth in part in the description which follows and in part will become more apparent to those skilled in the art upon examination of the following or may be learned from practice of the invention. It is intended that all such aspects are to be included within this description, are to be within the scope of the present invention, and are to be protected by the accompanying claims.

DETAILED DESCRIPTION

Reference will now be made in detail to embodiments of the invention, one or more examples of which are illustrated in the accompanying drawings. Each example is provided by way of explanation of the invention, not as a limitation of the invention. It will be apparent to those skilled in the art that various modifications and variations can be made in the present invention without departing from the scope or spirit of the invention. For example, features illustrated or described as part of one embodiment can be used in another embodiment to yield a still further embodiment. Thus, it is intended that the present invention cover such modifications and variations that come within the scope of the invention.

Figure 1:
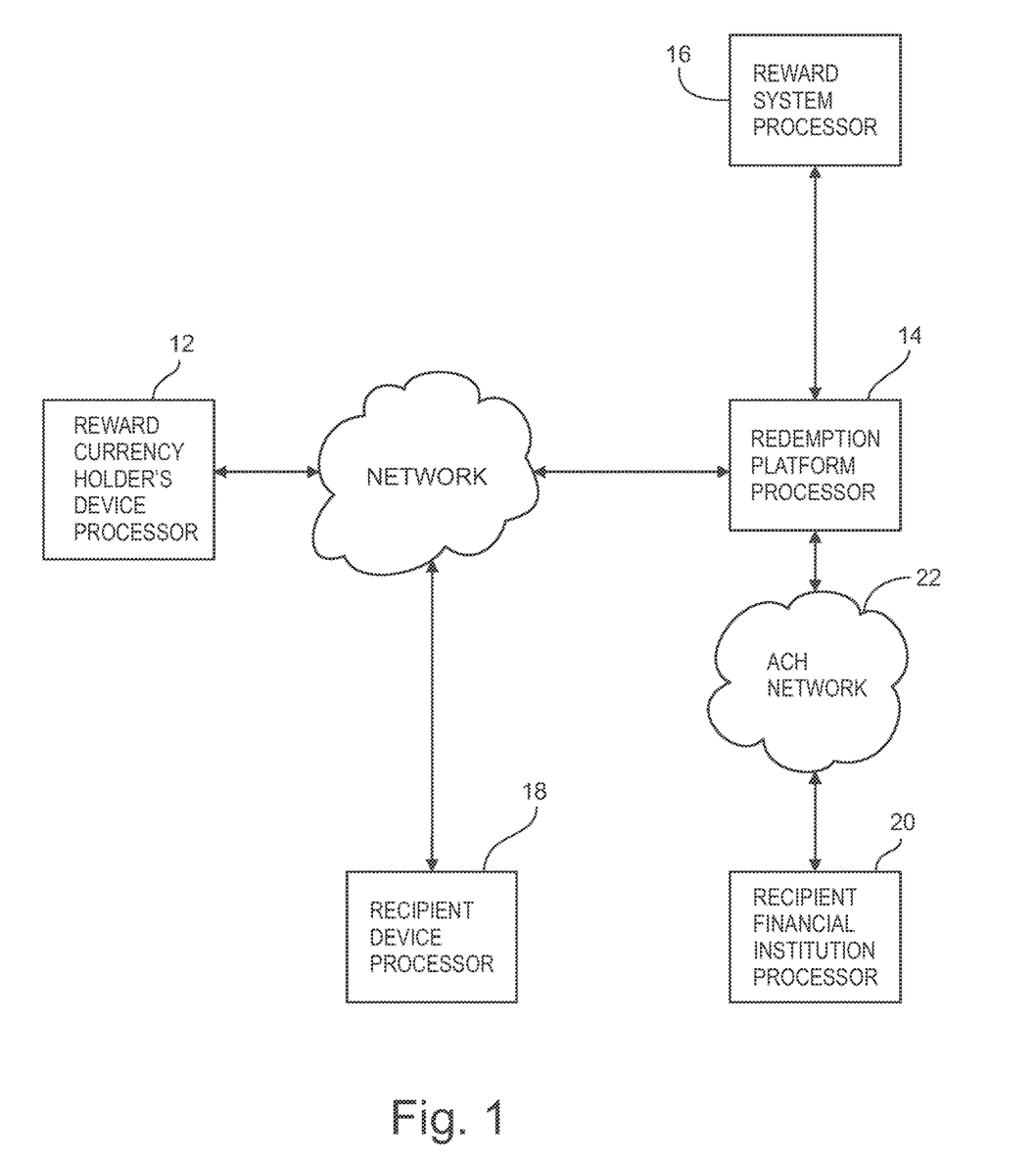
FIG. 1 is schematic diagram that illustrates an overview example of components and the flow of information between components for embodiments of the invention.

Embodiments of the invention provide methods and systems for person-to-person reward currency redemption that allow a holder of redeemable reward currency, such as cash-back, reward points or miles in a rewards account associated with a transaction card account, such as a credit card account, of a cardholder, to redeem such reward currency, as a direct deposit of cash to a deposit account, such as a checking account, of any person in the United States with such a deposit account. FIG. 1 is schematic diagram that illustrates an overview example of components and the flow of information between components for embodiments of the invention. According to embodiments of the invention, the reward currency holder who has redeemable rewards currency may initiate a person-to-person reward redemption request via a user interface using an electronic communication device 12, such as an online computing device, a tablet computer or a mobile application on a smart phone Thus, embodiments of the invention enable a reward currency holder with redeemable rewards currency to initiate a person-to-person rewards redemption request via a user interface which may be integrated, for example, into a financial institution's account online tool. Alternatively, the user interface may be integrated, for example, into a financial institution mobile application or tablet application. Further, the user interface may be, for example, a stand-alone mobile or tablet application for deployment respectively on a smartphone or a tablet computer. In embodiments of the invention, the card member may employ the user interface to request redemption of the reward currency holder's rewards via a person-to-person reward redemption. Once such a request is initiated, the reward currency holder may determine how much of the reward currency holder's redeemable rewards he or she wishes to have transferred to a recipient.

Figure 2:
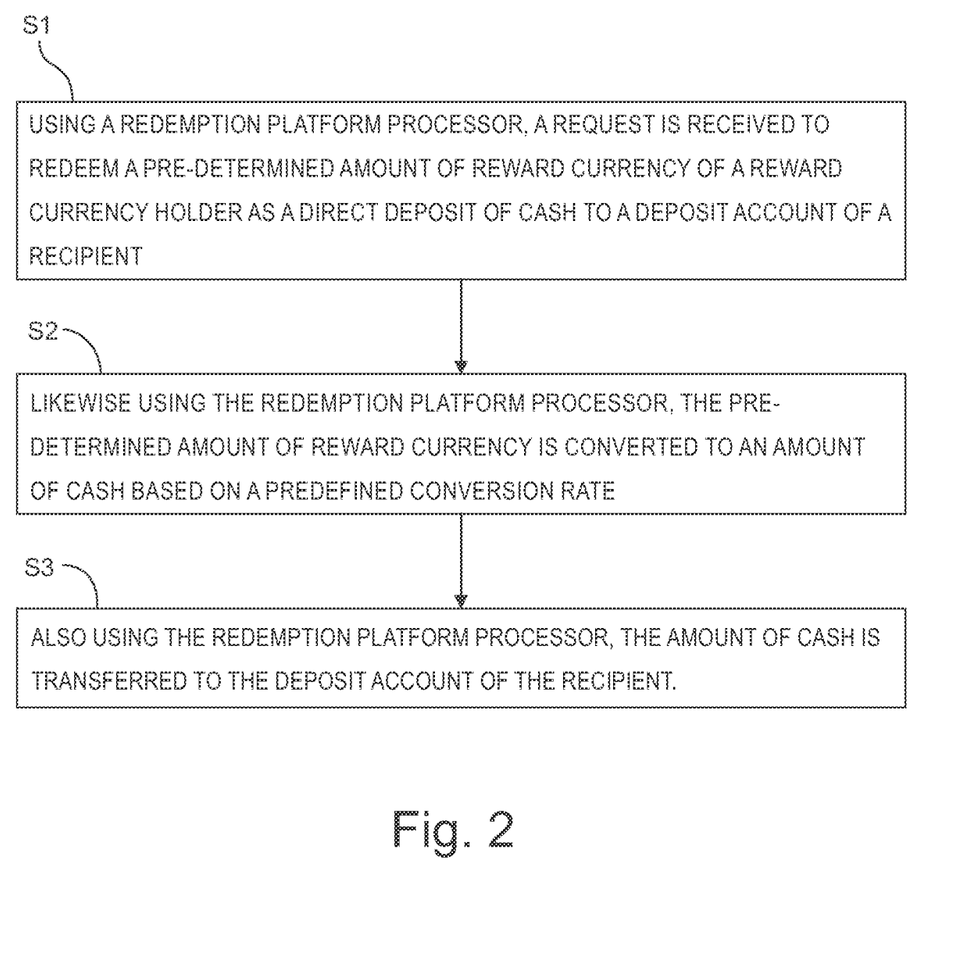
FIG. 2 is a flow chart that illustrates an overview example of the process of person-to-person reward currency redemption for embodiments of the invention.

FIG. 2 is a flow chart that illustrates an overview example of the process of person-to-person reward currency redemption for embodiments of the invention. Referring to FIGS. 1 and 2, at S1, using a redemption platform processor 14, a request may be received to redeem a pre-determined amount of reward currency of a reward currency holder as a direct deposit of cash to a deposit account 20 of a recipient. At S2, likewise using the redemption platform processor 14, the pre-determined amount of reward currency may be converted to an amount of cash based on a predefined conversion rate. At S3, also using the redemption platform processor, the amount of cash may be transferred to the deposit account 20 of the recipient.

Figure 3:
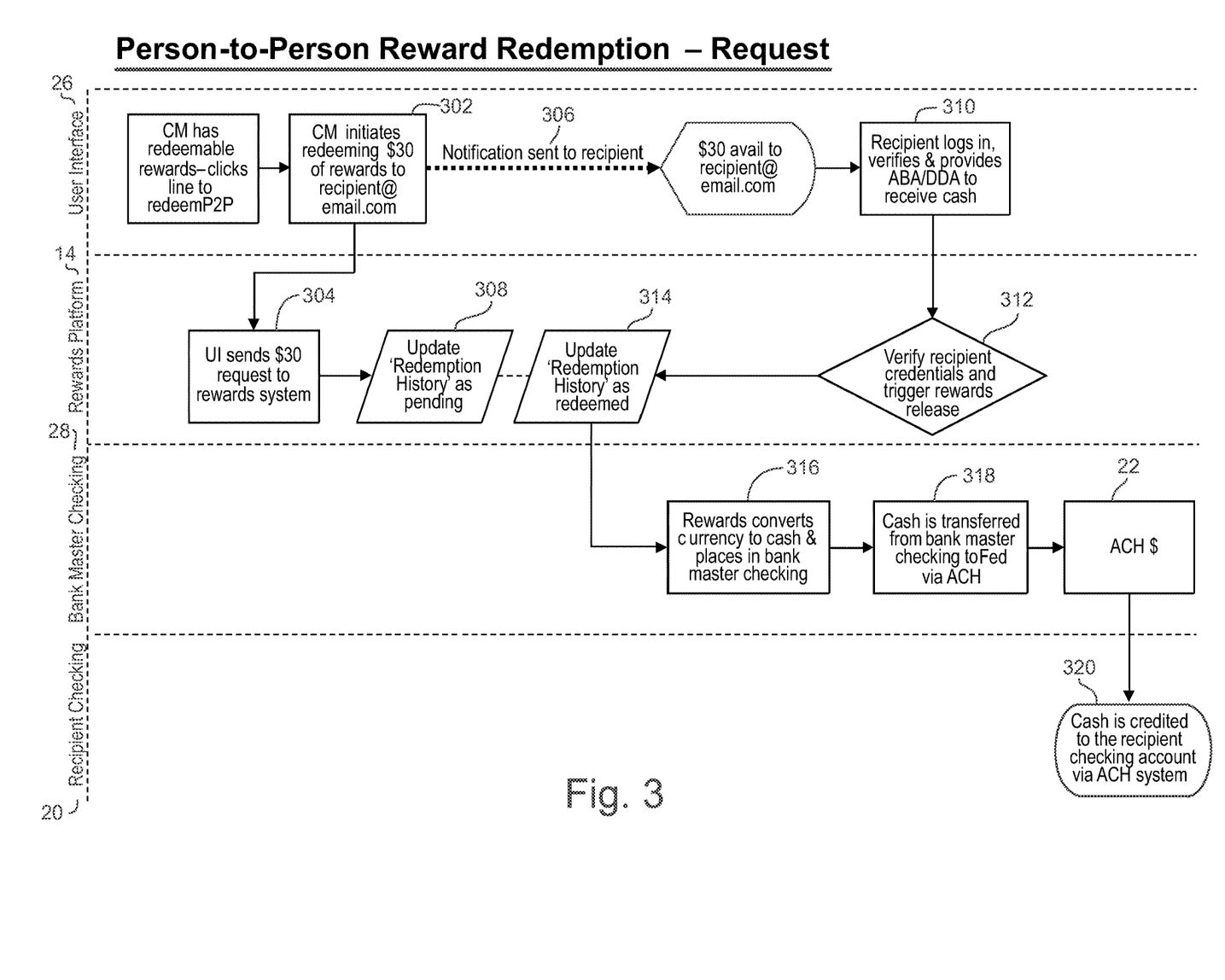
FIG. 3 is a diagram showing use a case example of the process of person-to-person reward currency redemption for embodiments of the invention.

FIG. 3 is a use case diagram showing an example of the process of person-to-person reward currency redemption for embodiments of the invention. Referring to FIGS. 1 and 3, the reward redemption request may be received via the user interface 26 by the redemption platform processor 14. When the card member's request is initiated at 302, a notification email may be generated to both the card member and the recipient, and the request may also be sent to a rewards system processor at 304. Thus, upon receiving the reward redemption request, the redemption platform processor 14 may cause a reward currency holder notification email message to be generated to the reward currency holder and a recipient notification email message to be generated at 306 to an electronic communication device 18 of the recipient. Additionally, as noted, the redemption platform processor 14 may cause a redemption request message to be sent to the reward system processor at 304.

Referring further to FIGS. 1 and 3, in response to receiving the redemption request message, in embodiments of the invention, the reward system processor 16 may update a redemption history of the reward currency holder's rewards account to a "pending" status at 308 and temporarily block redemption of reward currency of the reward currency holder via other means. For example, upon receiving the request, the reward system processor 16 may update a redemption history for the reward currency holder as 'pending' at 308 to earmark an amount of rewards to be redeemed for the transaction and to prevent the particular amount of rewards from being redeemed in another manner. The redemption platform processor 14 may send the notification email to the recipient's device at 306 alerting the recipient of an amount of cash that is being sent to the recipient and a predetermined time period within which the recipient may claim the cash.

In embodiments of the invention, in addition to alerting the recipient of the available cash, the recipient notification email message may contain directions instructing the recipient to proceed to a reward currency holder's website to verify the recipient's identity and to provide American Bankers Association ("ABA") routing information and demand deposit account information to receive the redemption as cash. The notification email to the recipient may also include a link via which the recipient may log in to the financial information system to verify his or her identity and provide his or her ABA routing information and demand deposit account ("DDA") account information to receive the cash.

Referring again to FIGS. 1 and 3, upon receiving entry of information verifying the recipient's identity, the ABA routing information, and the demand deposit account information at 310, the reward platform processor 14 may accept the recipient's information and confirm verification of the recipient's identity at 312. In addition, at 314, the reward system processor 16 may update the redemption history of the reward currency holder's rewards account from the "pending" status to a "redeemed" status. Thus, upon entry of the requested information by the recipient at 310 and verification of the recipient's credentials at 312, a rewards release may be triggered which may involve, for example, changing of the status of the reward currency holder's redemption history from the 'pending' to the 'redeemed' status at 314 for the earmarked amount of rewards to be redeemed.

Referring further to FIGS. 1 and 3, thereafter, at 316, the reward platform processor 14 may convert the earmarked amount of redeemed reward currency to cash and place the cash in a financial institution master checking account 28. At 318, the reward platform processor 14 may also initiate a transfer from the financial institution master checking account 28 to the recipient's checking account 20 via an ACH network process 22. The cash may thus be transferred from the bank master checking account 28 to the Federal Reserve System via the ACH network 22. Thereafter, at 320, the cash may be credited to the recipient checking account at another financial institution 20 via the ACH system network 22. Once the cash has been credited to the recipient's checking account, the recipient may access his or her checking account and see the cash listed as a person-to-person redemption.

In embodiments of the invention, instead of a recipient's checking account at another financial institution, the cash may be credited to a checking account of the recipient at the same financial institution, in which case, the ACH system may not be involved. Likewise, the reward currency holder may have the cash credited to his or her own checking account at the same or a different financial institution. Thus, embodiments of the invention may be used by the reward currency holder to send the cash that was converted from rewards currency to a bank deposit account at any U.S. based bank.

Embodiments of the invention may also be employed in a cross-borders aspect in which an electronic funds transfer means other than the U.S. electronic payment clearinghouse network of the ACH system may be used to transfer the cash cross-borders to a recipient's checking account. It is to be understood that such cross-borders aspect assumes full compliance with all applicable requirements including, without limitation, applicable legal and regulatory requirements for cross-border transfers of cash.

Further, embodiments of the invention may also be employed with any available rewards platform and are not limited to any particular type of rewards currency. Thus, the type of rewards may be proprietary rewards or third party rewards that may be affiliated with a transaction card, such as a credit card, for which the reward currency holder has an account. Any reward currency that may be earned and redeemed may be redeemed for cash at a pre-determined conversion rate established for the particular reward program and dispensed according to the methods and systems for embodiments of the invention.

Referring again to the user interface for embodiments of the invention, in addition to a smart phone or tablet computer, the user interface may be integrated into the financial institution's existing online account application and accessed, for example, from a reward currency holder's laptop or desktop computer. In addition, the user interface for embodiments of the invention may be provided as stand-alone or incorporated into a thin-client or thick-client mobile and/or tablet application. In the thin-client aspect, the application for embodiments of the invention may be deployed on an online server which is accessible by a user by logging on a website from a client computing device.

In such aspect, the application for embodiments of the invention may be accessed by the reward currency holder, for example, from a tablet computing device or a mobile phone via the Internet. In order to access the application using a mobile phone, such as a smartphone, a smartphone application may be provided for download to a reward currency holder's mobile phone. Alternatively, the user interface for embodiments of the invention may be provided via an automated teller machine ("ATM"). For example, a reward currency holder may access his or her rewards currency account via an ATM using his or her transaction card, such as a credit card or ATM card, to initiate a transfer request according to embodiments of the invention. As another alternative, a reward currency holder may initiate a transfer request according to embodiments of the invention via an interactive voice response ("IVR") phone channel.

As an additional alternative, a reward currency holder may initiate a transfer request according to embodiments of the invention via a customer service representative. In all such alternatives, when a user initiates a transfer request, the request sent to the rewards system processor 16 to hold the reward currency holder's rewards currency in the 'pending' status. In addition, a communication is initiated to the recipient 18 to make the recipient aware that cash is being transferred to the recipient's account 20. Once the recipient's credentials are verified, a release of rewards funds and a conversion of those rewards into cash is triggered, and the cash may be transferred to the recipient's checking account 20 via a cash transfer mechanism, such as the ACH network 22. It is to be noted that the financial institution checking account 28 is a book entry that provides a mechanism for holding the cash to be transferred after the rewards currency is converted into cash.

The funds may then be made available to the recipient for a pre-determined period of time within which the recipient must verify his or her identity in order to claim the cash. If the recipient fails to verify his or her identity and claim the cash within the pre-determined period of time, the ACH transaction may be reversed and the cash returned to the financial institution checking account 28. Thus, if the recipient fails to claim the transferred cash after a predetermined amount of time, the cash may be reconverted to rewards currency and returned to the reward currency holder's redeemable reward balance by the reward platform processor 14. In that event, the reward platform processor 14 may cause an email message to be generated to the reward currency holder 12 alerting the reward currency holder that the redemption was not completed. It should be noted that in addition to providing notifications to the recipient and reward currency holder by email, other means of notification may be employed, such as Short Message Service ("SMS") text messages or automated telephonic messages.

It is to be understood that embodiments of the invention may be implemented as processes of a computer program product, each process of which is operable on one or more processors either alone on a single physical platform, such as a personal computer, or across a plurality of platforms, such as a system or network, including networks such as the Internet, an intranet, a WAN, a LAN, a cellular network, or any other suitable network. Embodiments of the invention may employ client devices that may each comprise a computer-readable medium, including but not limited to, random access memory (RAM) coupled to a processor. The processor may execute computer-executable program instructions stored in memory. Such processors may include, but are not limited to, a microprocessor, an application specific integrated circuit (ASIC), and or state machines. Such processors may comprise, or may be in communication with, media, such as computer-readable media, which stores instructions that, when executed by the processor, cause the processor to perform one or more of the steps described herein.

It is also to be understood that such computer-readable media may include, but are not limited to, electronic, optical, magnetic, RFID, or other storage or transmission device capable of providing a processor with computer-readable instructions. Other examples of suitable media include, but are not limited to, CD-ROM, DVD, magnetic disk, memory chip, ROM, RAM, ASIC, a configured processor, optical media, magnetic media, or any other suitable medium from which a computer processor can read instructions. Embodiments of the invention may employ other forms of such computer-readable media to transmit or carry instructions to a computer, including a router, private or public network, or other transmission device or channel, both wired or wireless. Such instructions may comprise code from any suitable computer programming language including, without limitation, C, C++, C#, Visual Basic, Java, Python, Perl, and JavaScript.

It is to be further understood that client devices that may be employed by embodiments of the invention may also comprise a number of external or internal devices, such as a mouse, a CD-ROM, DVD, keyboard, display, or other input or output devices. In general such client devices may be any suitable type of processor-based platform that is connected to a network and that interacts with one or more application programs and may operate on any suitable operating system. Server devices may also be coupled to the network and, similarly to client devices, such server devices may comprise a processor coupled to a computer-readable medium, such as a random access memory (RAM). Such server devices, which may be a single computer system, may also be implemented as a network of computer processors. Examples of such server devices are servers, mainframe computers, networked computers, a processor-based device, and similar types of systems and devices.

What is claimed is:
1. A method, comprising:
receiving, by a redemption platform processor, from a processor of a communication device of a first party via a user interface integrated into an application executing on the processor of the communication device of the first party, a request to redeem a pre-determined amount of reward currency of the first party as a direct deposit of cash to a deposit account of a second party;
generating, by the redemption platform processor, a notification message to the processor of the communication device of the first party and sending, by the redemption platform processor, a redemption request message to a reward system processor;
updating, by the reward system processor, a redemption history of a rewards account of the first party to a "pending" status;
earmarking, by the reward system processor, at least the amount of reward currency of the first party to be deposited into the deposit account of the second party;
blocking, by the reward system processor, a redemption request received via a redemption request other than a direct deposit of cash to a deposit account of the pre-determined amount of reward currency;

converting, by the redemption platform processor, the pre-determined amount of reward currency to an amount of cash based on a predefined conversion rate;

transferring, by the redemption platform processor, the amount of cash to a financial institution checking account associated with the redemption platform processor;

generating by the redemption platform processor, a notification message to a processor of a communication device of the second party alerting the second party of the amount of cash to be transferred to the deposit account of the second party and the predetermined period of time within which an identity verification for the second party must be received as the condition for transferring the amount of cash to the deposit account of the second party;

reversing, by the redemption platform processor, the transfer of the amount of cash and reconverting the amount of cash to the predetermined amount of reward currency of the first party upon failure to receive the identity verification for the second party within the predetermined period of time; and notifying, by the redemption platform processor, the first party via the user interface that the predetermined amount of reward currency has been reversed based on the failure to receive the identity verification.

2. The method of claim 1, wherein receiving the request to redeem from the processor of the communication device further of the first party comprises receiving the request to redeem from the processor of an online electronic computing device of the first party.

3. The method of claim 1, wherein receiving the request to redeem via the user interface integrated into the application executing on the processor of the communication device of the first party further comprises receiving the request via the user interface integrated into an online application executing on the processor of the communication device of the first party.

4. The method of claim 1, wherein receiving the request to redeem via the user interface integrated into the application executing on the processor of the communication device of the first party further comprises receiving the request via the user interface integrated into a mobile communication device application or a tablet computing device application executing on the processor of the communication device of the first party.

5. The method of claim 1, wherein generating the notification message to the processor of the communication device of the first party further comprises generating the notification message via email, SMS text, or telephone to the processor of the communication device of the first party.

6. The method of claim 1, wherein receiving the request to redeem the predetermined amount of reward currency further comprises receiving the request to redeem the predetermined amount of reward currency associated with a transaction card account of the first party.

7. The method of claim 1, wherein receiving the request to redeem the reward currency as a direct deposit of cash to the deposit account of the second party further comprises receiving the request to redeem the reward currency as a direct deposit of cash to a checking account of the second party.

8. The method of claim 1, wherein generating the notification message to the processor of the communication device of the second party further comprises generating the notification message via email, SMS text, or telephone to the processor of the communication device of the second party.

9. The method of claim 1, wherein generating the notification message to the second party further comprises generating the notification message to the second party consisting at least in part of a request to the second party to verify the second party's identity and to provide routing and account information for the deposit account of the second party.

10. The method of claim 9, wherein generating the notification message to the second party consisting at least in part of the request to verify the second party's identity and to provide routing and account information further comprises receiving entry of information verifying the second party's identity and the routing and deposit account information for the deposit account of the second party.

11. The method of claim 10, wherein receiving entry of the information further comprises confirming verification of the second party's identity, updating a redemption history of the first party's rewards account from a "pending" status to a "redeemed" status, and releasing an earmarked pre-determined amount of rewards currency for conversion to the amount of cash.

12. The method of claim 1, wherein transferring the amount of cash to the deposit account of the second party further comprises placing the amount of cash in a financial institution master checking account.

13. The method of claim 12, wherein transferring the amount of cash to the deposit account of the second party further comprises initiating a transfer of the cash from the financial institution master checking account to the second party's checking account.

14. The method of claim 13, wherein initiating the transfer of the cash from the financial institution master checking account to the second party's checking account further comprises crediting the amount of cash to the second party's checking account at another financial institution via an Automated Clearing House ("ACH") network process.

15. The method of claim 13, wherein initiating the transfer of the cash from the financial institution master checking account to the second party's checking account further comprises crediting the amount of cash to the second party's checking account at the same financial institution.

16. The method of claim 13, wherein initiating the transfer of the cash from the financial institution master checking account to the second party's checking account further comprises crediting the amount of cash to the second party's checking account and allowing the second party to access the second party's checking account and see the cash listed as a person-to-person redemption.

17. The method of claim 13, wherein initiating the transfer of the cash from the financial institution master checking account to the second party's checking account further comprises crediting the amount of cash to the second party's checking account and making the amount of cash available to the second party if the second party verifies the second party's identity within a predetermined period of time.

18. The method of claim 1, wherein reversing the transfer of the amount of cash upon failure to receive the second party's identity verification within the predetermined period of time further comprises returning the amount of cash to the financial institution master checking account and generating a message alerting the first party that the redemption was not completed if the second party fails to verify the second party's identity within the predetermined period of time.

19. The method of claim 1, wherein transferring the amount of cash to the deposit account of the second party further comprises transferring the amount of cash to deposit accounts of a plurality of other parties.

20. A system, comprising:

a redemption platform processor coupled to memory and being programmed to:

receive, from a processor of a communication device of a first party via a user interface integrated into an application executing on the processor of the communication device of the first party, a request to redeem a pre-determined amount of reward currency of a first party as a direct deposit of cash to a deposit account of a second party; and generate a notification message to the processor of the communication device of the first party and send a redemption request message to a reward system processor;

the reward system processor being programmed to:

update a redemption history of a rewards account of the first party to a "pending" status;

earmark the amount of reward currency of the first party to be deposited into the deposit account of the second party; and block redemption of the pre-determined amount of reward currency via other means; the redemption platform processor being further programmed to:

convert the pre-determined amount of reward currency to an amount of cash based on a predefined conversion rate;

transfer the amount of cash to a financial institution checking account associated with the redemption platform processor;

generate a notification message to a processor of a communication device of the second party alerting the second party of the amount of cash to be transferred to the deposit account of the second party and the predetermined period of time within which the an identity verification for the second party must be received as the condition for transferring the amount of cash to the deposit account of the second party;

reverse the transfer of the amount of cash and reconverting the amount of cash to the predetermined amount of reward currency of the first party upon failure to receive the identity verification for the second party within the predetermined period of time; and notify the first party via the user interface that the predetermined amount of reward currency has been reversed based on the failure to receive the identity verification.

* * * * *